(12) United States Patent
Miao

(10) Patent No.: US 10,867,426 B2
(45) Date of Patent: Dec. 15, 2020

(54) IMAGE RENDERING METHOD AND SYSTEM

(71) Applicant: LENOVO (BEIJING) CO., LTD., Beijing (CN)

(72) Inventor: Tao Miao, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/358,214

(22) Filed: Mar. 19, 2019

(65) Prior Publication Data
US 2019/0295309 A1 Sep. 26, 2019

(30) Foreign Application Priority Data
Mar. 20, 2018 (CN) .......................... 2018 1 0227295

(51) Int. Cl.
G06T 15/00 (2011.01)
A63F 13/355 (2014.01)
G09G 5/377 (2006.01)

(52) U.S. Cl.
CPC .......... *G06T 15/005* (2013.01); *A63F 13/355* (2014.09); *G09G 5/377* (2013.01); *G09G 2340/10* (2013.01); *G09G 2370/022* (2013.01)

(58) Field of Classification Search
None
See application file for complete search history.

(56) References Cited

U.S. PATENT DOCUMENTS

| 8,403,757 B2* | 3/2013 | Mizrachi ................ A63F 13/12 463/42 |
| 9,842,377 B2* | 12/2017 | Kopf ........................ G06T 1/20 |
| 2002/0113791 A1 | 8/2002 | Li et al. |
| 2013/0123004 A1* | 5/2013 | Kruglick ................ A63F 13/50 463/29 |
| 2014/0187331 A1* | 7/2014 | Kim ....................... A63F 13/12 463/42 |
| 2014/0370986 A1* | 12/2014 | Kruglick .............. A63F 13/355 463/31 |
| 2017/0050110 A1* | 2/2017 | Perry ..................... A63F 13/23 |
| 2017/0115488 A1* | 4/2017 | Ambrus ................. G06T 11/60 |
| 2018/0218543 A1* | 8/2018 | Vembar ................... G06T 7/70 |
| 2019/0282898 A1* | 9/2019 | Perry .................... A63F 13/355 |
| 2019/0286458 A1* | 9/2019 | Koryakin ............... G06F 9/451 |
| 2020/0105047 A1* | 4/2020 | Huang .................... G06F 3/011 |

FOREIGN PATENT DOCUMENTS

| CN | 1845177 A | 10/2006 |
| CN | 101968887 A | 2/2011 |
| CN | 102073498 A | 5/2011 |

(Continued)

*Primary Examiner* — Ryan M Gray
(74) *Attorney, Agent, or Firm* — Anova Law Group, PLLC

(57) ABSTRACT

An image rendering method for an electronic device includes, according to a first image displayed at a first moment, obtaining from a server at least one second image rendered in advance and to be displayed at a second moment, and after the second moment arrives and if a target image in the at least one second image coincides with an operation before or at the second moment, using the target image rendered in advance as an image corresponding to the operation. The second moment is later than the first moment.

14 Claims, 3 Drawing Sheets

According to a first image displayed at a first moment, obtain from a server at least one second image rendered in advance and to be displayed at a second moment, the second moment being later than the first moment — S301

After the second moment arrives and if a target image in the at least one second image coincides with an operation before or at the second moment, use the target image rendered in advance as an image corresponding to the operation — S302

(56) References Cited

FOREIGN PATENT DOCUMENTS

| | | | |
|---|---|---|---|
| CN | 102196300 | A | 9/2011 |
| CN | 103617253 | A | 3/2014 |
| CN | 104200520 | A | 12/2014 |
| CN | 105096373 | A | 11/2015 |
| CN | 105427366 | A | 3/2016 |
| CN | 105791977 | A | 7/2016 |
| CN | 106652004 | A | 5/2017 |
| CN | 107222510 | A | 9/2017 |
| CN | 107274469 | A | 10/2017 |
| CN | 107274472 | A | 10/2017 |
| CN | 107370714 | A | 11/2017 |

\* cited by examiner

IMAGE RENDERING METHOD AND SYSTEM

CROSS-REFERENCE TO RELATED APPLICATION

This application claims priority to Chinese Application No. 201810227295.4, filed on Mar. 20, 2018, the entire contents of which are incorporated herein by reference.

FIELD OF THE DISCLOSURE

The present disclosure relates to image rendering technology and, more particularly, to an image rendering method and system, and an electronic device.

BACKGROUND

Recently, the idea of "cloud rendering" caught the attention of the world. "Cloud rendering" refers to moving heavy three-dimensional (3D) renderings to the Internet. A user terminal accesses resources via the high-speed Internet, and clicks a "cloud rendering" button in a web software or directly in a local 3D program. A command is sent from the user terminal, and a server executes the corresponding rendering task according to the command. The rendered image is transmitted back to the user terminal for display.

"Cloud Rendering" has pointed out a new direction for the 3D gaming industry. Compared to rendering locally on the user terminal in conventional technologies, the cloud server is responsible for all requirements on the central processing unit (CPU) and graphics processing unit (GPU). Thus, not much performance of the user terminal is required. As such, whether the 3D game supports the user terminal does not need to be considered, as long as the network speed satisfies the requirements, the 3D game will run smoothly, which is very attractive to many users.

However, the 3D game is highly sensitive to the response of user commands. For example, the user command must be responded to in a timely manner in a fierce battle game, such as Counter-Strike (CS) or the like. If a slight delay occurs, the game object controlled by the user is at risk of being shot. Although the network access performance of user terminal and server is currently being greatly improved to ensure the fast response required by the cloud rendering, delay always occurs, thereby being unable to provide users with an uninterrupted user experience.

The disclosed methods and systems are directed to solve one or more problems set forth above and other problems.

SUMMARY

In accordance with the present disclosure, there is provided an image rendering method for an electronic device including, according to a first image displayed at a first moment, obtaining from a server at least one second image rendered in advance and to be displayed at a second moment, and after the second moment arrives and if a target image in the at least one second image coincides with an operation before or at the second moment, using the target image rendered in advance as an image corresponding to the operation. The second moment is later than the first moment.

Also in accordance with the present disclosure, there is provided an electronic device including a processor and a memory. The memory is configured to store computer program instructions, and the processor executes the computer program instructions to, according to a first image displayed at a first moment, obtain from a server at least one second image rendered in advance and to be displayed at a second moment, and after the second moment arrives and if a target image in the at least one second image coincides with an operation before or at the second moment, use the target image rendered in advance as an image corresponding to the operation. The second moment is later than the first moment.

Also in accordance with the present disclosure, there is provided an image rendering system including an electronic device and a server. The electronic device includes a processor and a memory. The memory is configured to store computer program instructions, and the processor executes the computer program instructions to, according to a first image displayed at a first moment, obtain from the server at least one second image rendered in advance and to be displayed at a second moment, and after the second moment arrives and if a target image in the at least one second image coincides with an operation before or at the second moment, use the target image rendered in advance as an image corresponding to the operation. The second moment is later than the first moment. The server is configured to, according to the first image displayed at the first moment, render the at least one second image to be displayed at the second moment in advance, and send the at least one second image to the electronic device.

BRIEF DESCRIPTION OF THE DRAWINGS

In order to provide clearer illustration of embodiments of the present disclosure, brief descriptions of the drawings of the present disclosure are provided. The following drawings merely illustrate embodiments of the present disclosure. Other drawings may be obtained based on the disclosed drawings by those skilled in the art without creative efforts.

DETAILED DESCRIPTION

Hereinafter, in order to provide a better understanding of the present disclosure for those skilled in the art, embodiments of the present disclosure are described with reference to the drawings. It is apparent that the disclosed embodiments are merely some but not all of embodiments of the present disclosure. Other embodiments of the present disclosure may be obtained based on the embodiments disclosed herein by those skilled in the art without creative efforts, which are intended to be within the scope of the present disclosure.

The terms "first," "second," or the like in the specification, claims, and the drawings of the present disclosure are merely used to distinguish similar elements, and are not intended to describe a specified order or a sequence. The involved elements may be interchangeable in any suitable situation, so that the present disclosure can be performed in the order or sequence different from that shown in the figures or described in the specification. In addition, the terms "including," "comprising," and variations thereof herein are open, non-limiting terminologies, which are meant to encompass a series of steps of processes and methods, or a series of units of systems, apparatus, or devices listed thereafter and equivalents thereof as well as additional steps of the processes and methods or units of the systems, apparatus, or devices.

Currently, the "cloud rendering" can render a 3D game on a remote server, and the rendered images can be sent to a user terminal over a network. A user can control the 3D game at the user terminal, and a control command can be transmitted to the remote server via the network. The remote server can transmit a rendered result back to the user terminal, according to the user's control command, and the rendered result can be displayed on a display interface of the user terminal. In this scenario, the user terminal can only perform a display function and keyboard and mouse input control functions, and all processing of the 3D game can be implemented on the remote server. The transmission of the user's control command and the rendering of the image will cost time, causing the user's control command always having a delay, such that a timely response cannot be obtained and the user experience can be seriously reduced.

Figure 1:
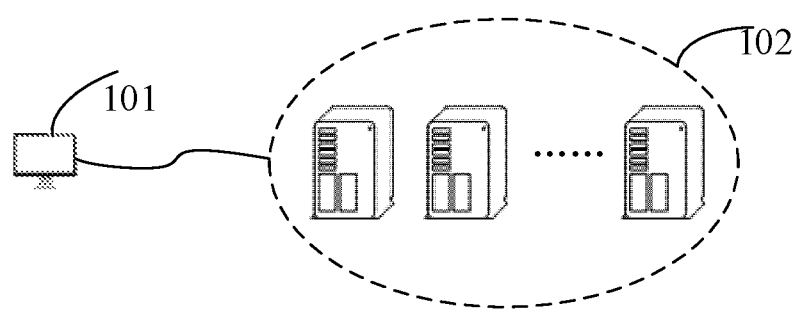
FIG. 1 is a schematic diagram of a system environment of an image rendering system according to the present disclosure.

Consistent with the present disclosure, an image rendering system can provide the user with an uninterrupted user experience based on, for example, the "cloud rendering." FIG. 1 is a schematic diagram of a system environment of the image rendering system consistent with the present disclosure.

As shown in FIG. 1, the system environment includes a hardware environment and a network environment. The hardware environment includes an electronic device 101 and a server cluster 102 connected to the electronic device 101 via the network (e.g., a wired network connection and/or a wireless network connection). The electronic device 101 can be configured to, for example, temporarily perform the rendering locally. The server cluster 102 can be configured to, for example, perform the cloud remote rendering. The hardware environment and structure shown in FIG. 1 are merely exemplary and not intend to limit the present disclosure. The hardware environment may also have other components and structures according to requirements, and may include, for example, a gateway or the like.

The wireless network can include, but is not limited to, a wide region network, a metropolitan region network, a local region network, or a mobile data network. The mobile data network can include, but is not limited to, a Global System for Mobile Communications (GSM) network, a Code Division Multiple Access (CDMA) network, a Wideband Code Division Multiple Access (WCDMA) network, a 5G mobile communication network, a Long-Term Evolution (LTE) communication network, a WIFI network, a ZigBee network, a Bluetooth-based network, or the like. Different types of communication networks may be operated by different operators. It is not intended to limit the type of communication network herein.

The electronic device 101 can include a mobile terminal having a processor with general performance, such as a mobile phone, a tablet computer, a notebook computer, or the like. The mobile terminal can also include a portable mobile device, a pocket-sized mobile device, a handheld mobile device, a computer-integrated mobile device, or in-vehicle mobile device. The mobile terminal can be used as the user terminal. In some embodiments, the electronic device 101 can include a display. The display may be any suitable type, such as a liquid crystal display, an organic light emitting display, a cathode ray tube (CRT) display, or the like. The electronic device 101 can include an input device. The input device can include a mouse, a keyboard, a touch screen or a touch panel, or the like. The touch screen or the touch panel can include, but are not limited to, a resistive type, a capacitive type, an infrared type, and a surface acoustic wave type. It is not intended to limit the type of the touch screen or the touch panel herein.

The server cluster 102 can act as a whole from an externally perspective. The server can have a high-performance processor and a high-end graphics technology, and have the capability to build a cloud rendering platform. The high-performance processor can include a high-performance graphics processing unit (GPU) and a high-performance central processing unit (CPU). The high-end graphics technologies can include, but are not limited to, the hardware transform and lighting (T&L), cube environment map texture and vertex blending, texture compression and bump mapping, dual-texture four-pixel 256-bit rendering engine, or the like.

Taking the "cloud rendering" of the 3D game as an example, as shown in FIG. 1, the server cluster 102 can render the screen image to be displayed by the electronic device 101 in advance, and transmit the screen image that is rendered in advance to the electronic device 101 before the screen image being displayed by the electronic device 101. The user can control the 3D game in the electronic device 101. If the screen image that is rendered in advance received by the electronic device 101 coincidences an actual image to be displayed, the electronic device 101 can directly use and display the image that is rendered in advance. If the screen image that is rendered in advance received by the electronic device 101 does not match the actual image to be displayed, the electronic device 101 can temporarily render the image locally or the control command can be transmitted to the server cluster 102 via the network and the server cluster 102 can transmit the rendered result back to the display interface of the electronic device 101 according to the user's control command, and the rendered result can be displayed on the display interface of the electronic device 101.

Consistent with the embodiment, the 3D game can be predictively rendered in the server cluster 102, and the predictively rendered image can be sent to the electronic device 101 via the network. If the screen image predictively rendered by the server cluster 102 does not match the actual image to be displayed by the electronic device 101, the electronic device 101 or the server cluster 102 can temporarily implement the rendering to provide an uninterrupted user experience. The electronic device 101 can perform the display function and the keyboard and mouse input control functions, and can also perform the image rendering processing work.

Therefore, combined with data in the 3D game, the image to be displayed at the user side can be predictively rendered at the cloud in advance, such that the user can directly use the image that the cloud renders in advance for displaying, thereby providing better uninterrupted user experience for the user.

Figure 2:
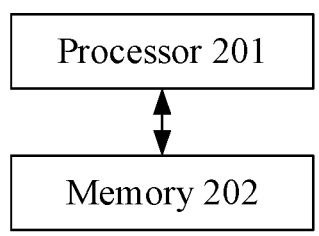
FIG. 2 is a schematic diagram of an electronic device according to the present disclosure.

FIG. 2 is a schematic diagram of the electronic device 101 in the above-described operating environment consistent with the present disclosure. As shown in FIG. 2, the electronic device 101 includes a processor 201 and a memory 202.

The processor 201 can be any suitable processor, and can include at least a central processing unit CPU and a graphics processing unit GPU, for example, implemented as a central processing unit, a microprocessor, an embedded processor, a tensor processor, a graphics processor, and the like, or any combination thereof. The processor 201 can use X86, ARM, and another architecture.

The memory 202 can be configured to store computer program instructions. The computer program instructions can be configured to be loaded by the processor 201 and to perform an image rendering method (described in detail later). The memory 202 can be any suitable storage device including, but not limited to, a magnetic storage device, a semiconductor storage device, an optical storage device, or the like. It is not intended to limit the memory 202 herein.

Figure 3:
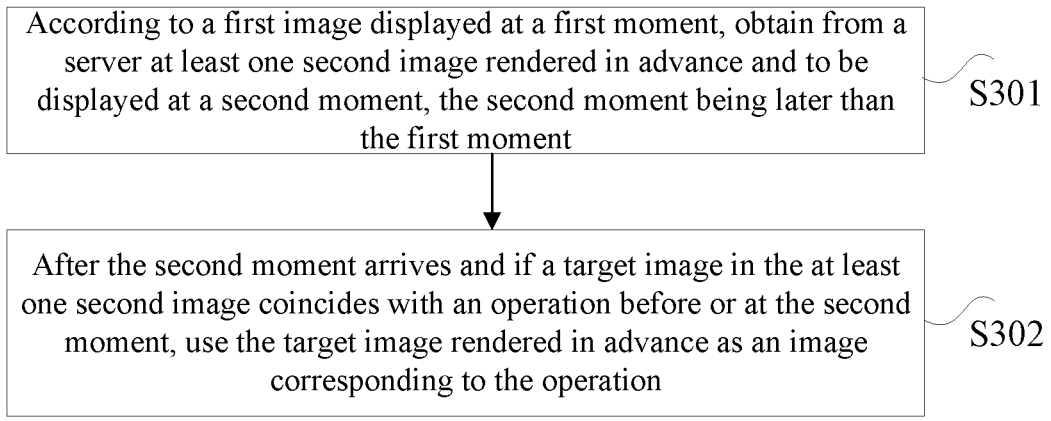
FIG. 3 is a flowchart of an image rendering method according to the present disclosure.

FIG. 3 is a flowchart of the image rendering method consistent with the present disclosure. The method can be loaded and executed by the processor 201 of the electronic device 101. It can be appreciated that processes shown in the flowchart of the FIG. 2 may be executed, for example, by a set of computer executable instructions in a computer system. Although a logical order is shown in the flowchart, in some scenarios, the processes shown or described may be executed in an order different from the one described herein.

As shown in FIG. 3, at S301, according to a first image displayed at a first moment, at least one second image rendered in advance and to be displayed at a second moment is obtained. The second moment is later than the first moment.

At S302, after the second moment arrives and if a target image in the at least one second image coincides with an operation before or at the second moment, the target image rendered in advance is used as an image corresponding to the operation.

For example, the user launches an application (e.g., a 3D game) in the electronic device 101, and the display interface of the electronic device 101 can display game screen images of the 3D game. The server cluster 102 can render a game screen image to be displayed by the electronic device 101 in advance, according to the game screen image currently displayed by the electronic device 101. A current time at which the electronic device 101 displays the current screen image can be regarded as the first moment, and any point of time later than the first moment can be regarded as the second moment. For example, the second moment can include the time corresponding to a next frame (but not limited to the next frame) of the current screen image.

It can be appreciated that the server cluster 102 can predict the operation of the electronic device 101 at or before the second moment, according to the data in the 3D game (e.g., the currently displayed game screen image). The operation can include a user's input operation and an operation automatically generated by the system. The game screen image to be displayed by the electronic device 101 can be rendered in advance according to the predicted operation. In some embodiments, the server cluster 102 can predict the game screen image to be displayed by the electronic device 101 according to multiple prediction branches, and may render the at least one predicted game screen image that the electronic device 101 is likely to display in advance, according to the results from multiple prediction branches. Each prediction branch can correspond to a predicted operation, i.e., an operation may take place at the second moment that is predicted at the first moment). For example, when a character in the 3D game is running forward, the character can be assumed to keep running forward or stop running at the next 0.1 second. Therefore, several scenarios corresponding to the predicted operations, e.g., keeping running forward, stopping running, or the like, can be rendered in the server cluster 102 and transmitted to the electronic device 101.

Therefore, at S301, the at least one second image rendered in advance and to be displayed at the second moment can be obtained, according to the first image displayed at the first moment. That is, the electronic device 101 can obtain, from the server cluster 102, the at least one second image to be displayed at the second moment rendered by the server cluster 102 in advance, according to the currently displayed first image. After the second moment arrives and if the target image in the at least one second image coincides with the operation of the electronic device 101 before or at the second moment, the target image rendered in advance by the server cluster 102 can be used, e.g., displayed, at S302. Herein, the target image coinciding with the operation of the electronic device 101 before or at the second moment refers to that the predicted operation corresponding to the target image coincides the operation of the electronic device 101 before or at the second moment.

The server cluster 102 can render the at least one second image of the second moment in advance, according to the first image of the first moment, and transmit the at least one second image to the electronic device 101.

After the second moment arrives and if the at least one second image has no target image that coincidences the operation before or at the second moment, the electronic device 101 can perform the render locally at the second moment to obtain and display a third image. Although the electronic device 101 can temporarily perform the rendering locally, or use the server cluster 102 to perform rendering again according to the operation at or before the second moment, because it takes time to transmit the control command corresponding to the operation before or at the second moment to the server cluster 102 and to perform rendering and transmit the rendered result back to the electronic device 101 from the server cluster 102, much more time may be wasted in total. Therefore, in some embodiments, after the second moment arrives and if the at least one second image has no target image that coincidences the operation before or at the second moment, the electronic device 101 can perform the rendering locally at the second moment to obtain and display the third image. Combining the "cloud rendering" with a local rendering can provide the user a better visual experience.

Because the third image is temporarily rendered locally by the electronic device 101 at the second moment, and the target image in the second image has been already rendered in advance, a duration of time for the electronic device 101 to switch from the first image to the third image is to be greater than the duration of time to switch from the first image to the target image.

In some embodiments, a candidate image can be selected from the at least one second image, and the image that needs to be rendered at the second moment can be partially rendered while comparing the image to be rendered with the candidate image. A partial image of the candidate image that does not coincide with the operation before or at the second moment can be replaced by the partial image that is partially rendered to form the third image and the third image can be displayed.

The candidate image can be any one of the at least one second image that is rendered in advance, for example, an image that has a highest degree of coincidence with the operation before or at the second moment. A partial image of the candidate image can include an image in a portion of the image area in the candidate image. The image to be rendered at the second moment may be a rendering object that is required to be rendered by the control command corresponding to the operation before or at the second moment. For example, the rendering object can be a character in the 3D game. An actual image to be displayed at the second moment, e.g., the third image, can be obtained by overall rendering the image to be rendered. The candidate image can include the image that has been rendered in advance. The image to be rendered can include the rendering object that needs to be prepared before rendering, and the image to be rendered can include the candidate image or a partial image of the candidate image.

When the image to be rendered includes the candidate image, the candidate image and the actual image to be displayed can be compared and the portion of the candidate image that is different from the actual image can be rendered locally, such that the partial image can be obtained by partially rendered the portion of the candidate image that is different from the actual image locally. The partial image of the candidate image that does not coincide with the operation before or at the second moment can be replaced by the partial image that is partially rendered to form the actual image to be displayed at the second moment, e.g., the third image, and the third image can be displayed.

When the image to be rendered does not include the candidate image, the candidate image and the actual image to be displayed can be compared to determine a region to be rendered. The region to be rendered of the image to be rendered can be rendered to obtain the rendered result of the region to be rendered. The rendered results of regions other than the region to be rendered can be directly copied from the candidate images. As such, the actual image to be displayed at the second moment, e.g., the third image can be formed and the third image can be displayed.

The partially rendering can include the following processes. The image to be rendered can be obtained. According to a new geometry, viewpoint, texture, and illumination information, the image in the image to be rendered corresponding to a differentiated region can be temporarily taken over, and the image in the differentiated region can be temporarily rendered locally. The differentiated region refers to the region in the image to be rendered that does not coincide with the operation before or at the second moment.

For example, the character is running forward in the current game screen in the 3D game. The obtained at least one second image rendered in advance and to be displayed at the second moment can include an image in which the character continues to run forward and an image in which the character stops running. After the second moment arrives and if the actual image to be displayed at the second moment is "the character is still running, but the direction of the run is left front". In this scenario, "the image that the character continues to run forward" can be selected as the candidate image. The actual image can be compared with the candidate image. If the actual image differs from the candidate image only in the "the region where the person is located, i.e., the differentiated region", only the differentiated region can be temporarily rendered. The third image to be displayed can be obtained by replacing the image in the differentiated region in the candidate image by the image in the differentiated region that is temporally rendered. As such, the partial rendering that is temporarily taken over by the electronic device 101 does not require much processing. Therefore, the electronic device 101 can also quickly display the third image, and an uninterrupted user experience can be better provided.

In some embodiments, comparing the candidate image and locally rendering the image to be rendered at the second moment can include the following processes. The image to be rendered at the second moment can be obtained. A position of the partial image of the candidate image that does not coincide with the operation before or at the second moment in the image to be rendered can be determined. The partial region of the image to be rendered can be partially rendered, according to the position of the partial image in the image to be rendered.

Figure 4:
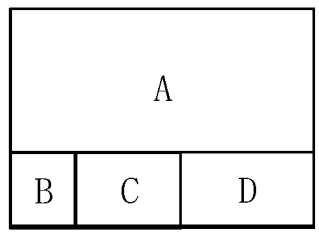
FIG. 4 schematically shows a candidate image according to the present disclosure.

For example, a position relationship between the candidate image and the image to be rendered can be established, and the image to be rendered can be partially rendered according to the position relationship. FIG. 4 schematically shows the candidate image consistent with the present disclosure. For example, as shown in FIG. 4, the candidate image includes four image regions A, B, C, and D. If the image in the A region does not coincide with the operation before or at the second moment, only the image in the A region of the image to be rendered can be partially rendered. That is, only partial region A of the image to be rendered can be rendered while comparing the image to be rendered with the candidate image. The regions (e.g., B, C, D) other than the partial region A of the image to be rendered can be not rendered. The image in the image regions of the candidate image, corresponding to the positions of the image regions B, C, D of the image to be rendered, can be directly used as the image regions B, C, and D of the image to be rendered.

In some embodiments, the electronic device 101 implementing the rendering at the second moment, and obtaining and displaying the third image may further include the following processes. An image in at least one image region of the at least one second image that coincidences the operation before or at the second moment can be obtained. If two or more images in at least one image region are obtained, the two or more images can be combined to form a combined image. If the combined image forms a complete image, the combined image can be used as the third image and the third image can be displayed. If the combined image does not form the complete image, the image to be rendered can be partially rendered while comparing the image to be rendered with the combined image. The partially rendered image can be used to compensate for a missing in the combined image to form the third image and the third image can be displayed.

Figure 5:
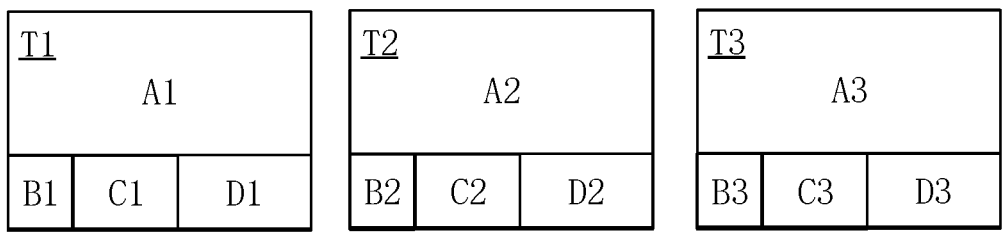
FIG. 5 schematically shows rendering at least one second image to be displayed at a second moment in advance according to the present disclosure.

FIG. 5 schematically shows rendering the at least one second image to be displayed at the second moment in advance consistent with the present disclosure.

For example, as shown in FIG. 5, the at least one second image rendered in advance and to be displayed at the second moment includes an image T1, an image T2, and an image T3. The image T1 includes four image regions A1, B1, C1, and D1, the image T2 includes four image regions A2, B2, C2, and D2, and the image T3 includes four image regions A3, B3, C3, and D3.

Figure 6:
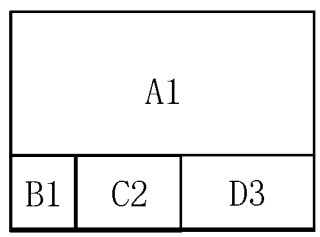
FIG. 6 schematically shows a combined image forming a complete image according to the present disclosure.

Assuming only the images in the image regions A1, B1, C2, and D3 coincide with the operation before or at the second moment, the image in the image regions A1, B1, C2, D3 can be extracted and combined to form the third image. FIG. 6 schematically shows the combined image forming the complete image consistent with the present disclosure. For example, the third image can be formed as shown in FIG. 6 including only the image regions A1, B1, C2, and D3, and the combined image can be displayed.

Figure 7:
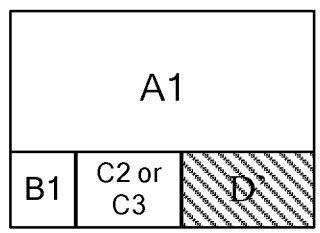
FIG. 7 schematically shows a combined image without forming a complete image according to the present disclosure.

FIG. 7 schematically shows the combined image without forming a complete image consistent with the present disclosure. Assume only the images in the image regions A1, B1, C2, and C3 coincide with the operation before or at the second moment, the image regions A1, B1, and C2 or C3 can be extracted and combined to form the combined image. In this scenario, the combined image has the missing at the D' region (as shown by the shading in FIG. 7) corresponding to the D region of the image to be rendered. That is, the combined image does not form the complete image, and the image located in the D region of the image to be rendered can be partially rendered while comparing the image to be rendered with the combined image in which the D' region is missing. The partial image in the partially rendered D region can be used to compensate for the missing in the combined image to form the third image and the third image can be displayed. That is, only the image in the D region of the image to be rendered corresponding to the missing region D' of the combined image can be partially rendered while comparing the image to be rendered with the combined image. The regions (e.g., A, B, C) other than the partial region D of image to be rendered will not be rendered, but the A, B, C of the at least one second image that coincides with the operation before or at the second moment can be directly extracted and used as the image regions A, B, and C of the image to be rendered.

Consistent with the present disclosure, combined with data in the 3D game, the image to be displayed at the user terminal can be predictively rendered at the cloud in advance, such that the user can directly use the image that the cloud renders in advance for displaying, thereby providing better uninterrupted user experience for the user.

Figure 8:
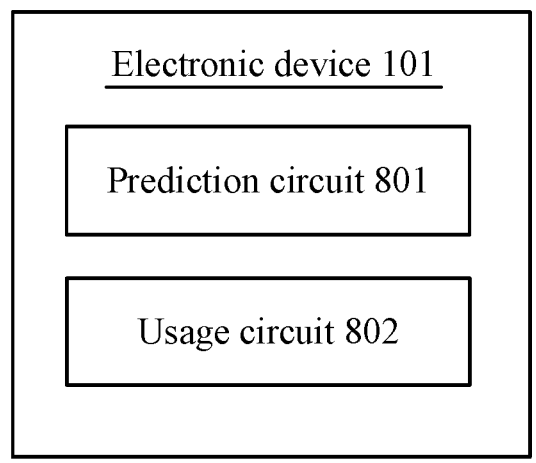
FIG. 8 is a schematic diagram of another electronic device according to the present disclosure.

FIG. 8 is a schematic diagram of the electronic device 101 in the above-described operating environment consistent with the present disclosure. As shown in FIG. 8, the electronic device 101 includes a prediction circuit 201 and a usage circuit 202.

The prediction circuit 201 can be configured to obtain the at least one second image rendered in advance and to be displayed at the second moment, according to the first image displayed at the first moment. The second moment is later than the first moment.

The usage circuit 202 can be configured to, in response to the second moment arrives, if the target image in the at least one second image coincides with the operation before or at the second moment, use the target image rendered in advance as the image corresponding to the operation.

It will be appreciated by those skilled in the art that the structure shown in FIG. 8 is merely for illustration and does not intended to limit the structure of the electronic device 101. For example, the electronic device 101 may also include more components or less components than those shown in FIG. 8, such as a communication circuit, or have a different configuration than that shown in FIG. 8. In addition, the functional units of the electronic device 101 shown in FIG. 8 may be integrated into one processing unit, or may physically exist separately, or two or more functional units may be integrated into one processing unit. The integrated units can be realized by means of software plus a hardware platform, merely a hardware platform, or in the form of software functional units.

If the functions are implemented in the form of software functional units, and sold or used as a separate product, the functions may be stored in a computer-readable storage medium. Based on this understanding, embodiments of the present disclosure can be implemented in the form of a software product. The software product stored in a storage medium includes a number of instructions for enabling a computer device (which may be a mobile phone, a computer, a server, or a network device, etc.) to perform all or part of a method consistent with the present disclosure, such as one of the methods described above. The aforementioned storage medium includes one or more of various mediums that can store instructions, such as a USB disk, a mobile hard disk, a Read-Only Memory (ROM), a Random Access Memory, a magnetic disk, or an optical disk, or the like.

For the sake of simplicity, the above-mentioned embodiments of the method, electronic device, and system are described as a series of steps or combination of units, but a person in the art will recognize that the present disclosure is not limited by the described sequence of steps or the connection of units. In accordance with the present disclosure, certain steps may be performed in other order or at the same time, some units may use other connections.

It should also be understood by the person in the art that the embodiments described in the specification are merely examples. The numbers in the disclosed embodiments are merely for the purpose of description, and the steps and units are not necessary for the present disclosure. For embodiments of the present disclosure, different embodiments may have different focus. The portions not detailed in one embodiment may be found in the relevant description of other embodiments.

In several disclosed embodiments, it should be understood that the disclosed technical solution may be implemented in other ways. For example, the embodiments of the apparatus described-above are merely for illustration. For example, the division of the units is merely a logical function division, and there may be other ways for implementing. For example, multiple units or components may be combined or may be integrated into another system, or some feature may be ignored, or not executed. In other respects, the mutual coupling, direct coupling, or communication connection shown or discussed herein may be either an indirect coupling or a communication connection via communication interfaces, apparatus, or units, and may be electrical type, or other types.

The units described as separate parts may or may not be physically separated, and the components shown as units may or may not be physical units, i.e., they may be located in one place or may be distributed over a network. Part or all of the units may be selected according to the actual needs to achieve the objective of the embodiment.

The embodiments disclosed herein are merely examples. Other applications, advantages, alternations, modifications, or equivalents to the disclosed embodiments are obvious to a person skilled in the art and are intended to be encompassed within the scope of the present disclosure.

What is claimed is:

1. An image rendering method for an electronic device, comprising:
    according to a first image displayed at a first moment, obtaining from a server at least one second image rendered in advance and to be displayed at a second moment, the second moment being later than the first moment;
    after the second moment arrives and if a target image in the at least one second image coincides with an operation before or at the second moment, using the target image rendered in advance as an image corresponding to the operation;
    after the second moment arrives, if the at least one second image does not include the target image that coincides with the operation before or at the second moment, locally rendering an image at the second moment to obtain a third image, including:
  selecting, by the electronic device, a candidate image from the at least one second image;
  partially rendering, by the electronic device, a partial region in the candidate image according to one or more of a new geometry, a new viewpoint, a new texture, and a new illumination information; and
  replacing a portion of the candidate image that does not coincide with the operation with the partially rendered partial region to form the third image.

2. The method according to claim 1, wherein:
a duration of time to switch from the first image to the third image is greater than the duration of time to switch from the first image to the target image.

3. The method according to claim 1, wherein locally rendering the image at the second moment to obtain the third image includes:
  determining a position of the portion of the candidate image that does not coincide with the operation in the image to be rendered; and
  partially rendering the partial region of the image according to the position of the partial image in the image to be rendered portion of the candidate image.

4. The method according to claim 1, wherein rendering the image at the second moment to obtain the third image further includes:
  obtaining images in at least one image region of the at least one second image that coincidence the operation before or at the second moment;
  combining the images in at least one image region to form a combined image; and
  in response to that the combined image forms a complete image, using the combined image as the third image.

5. The method according to claim 4, wherein rendering the image to be rendered at the second moment to obtain the third image further includes:
  in response to that the combined image does not form a complete image, partially rendering the image to be rendered while comparing the image to be rendered with the combined image; and
  adding the partially rendered image of the image to be rendered to the combined image to form the third image.

6. The method according to claim 1, wherein the server is configured to perform:
  according to the first image displayed at the first moment, rendering the at least one second image to be displayed at the second moment in advance; and
  sending the at least one second image to the electronic device.

7. An electronic device comprising:
a processor; and
a memory configured to store computer program instructions, wherein the processor executes the computer program instructions to:
  according to a first image displayed at a first moment, obtain from a server at least one second image rendered in advance and to be displayed at a second moment, the second moment being later than the first moment;
  after the second moment arrives and if a target image in the at least one second image coincides with an operation before or at the second moment, use the target image rendered in advance as an image corresponding to the operation; and
  after the second moment arrives, if the at least one second image does not include the target image that coincides with the operation before or at the second moment, locally render an image at the second moment to obtain a third image, including:
    selecting, by the electronic device, a candidate image from the at least one second image;
    partially rendering, by the electronic device, a partial region in the candidate image according to one or more of a new geometry, a new viewpoint, a new texture, and a new illumination information; and
    replacing a portion of the candidate image that does not coincide with the operation with the partially rendered partial region to form the third image.

8. The method according to claim 7, wherein:
a duration of time to switch from the first image to the third image is greater than the duration of time to switch from the first image to the target image.

9. The method according to claim 7, wherein the processor further executes the computer program instructions to:
  determine a position of the portion of the candidate image that does not coincide with the operation in the image to be rendered; and
  partially render the partial region of the image according to the position of the partial image in the image to be rendered.

10. The method according to claim 7, wherein the processor further executes the computer program instructions to:
  obtain images in at least one image region of the at least one second image that coincidence the operation before or at the second moment;
  combine the images in at least one image region to form a combined image; and
  in response to that the combined image forms a complete image, use the combined image as the third image.

11. The method according to claim 10, wherein the processor further executes the computer program instructions to:
  in response to that the combined image does not form a complete image, partially render the image to be rendered while comparing the image to be rendered with the combined image; and
  add the partially rendered image of the image to be rendered to the combined image to form the third image.

12. An image rendering system comprising:
an electronic device including:
  a processor; and
  a memory configured to store computer program instructions, wherein the processor executes the computer program instructions to:
    according to a first image displayed at a first moment, obtain from a server at least one second image rendered in advance and to be displayed at a second moment, the second moment being later than the first moment;
    after the second moment arrives and if a target image in the at least one second image coincides with an operation before or at the second moment, use the target image rendered in advance as an image corresponding to the operation; and
    after the second moment arrives, if the at least one second image does not include the target image that coincides with the operation before or at the second moment, locally render an image at the second moment to obtain a third image, including:

selecting, by the electronic device, a candidate image from the at least one second image;
partially rendering, by the electronic device, a partial region in the candidate image according to one or more of a new geometry, a new viewpoint, a new texture, and a new illumination information; and
replacing a portion of the candidate image that does not coincide with the operation with the partially rendered partial region to form the third image; and the server configured to:
according to the first image displayed at the first moment, render the at least one second image to be displayed at the second moment in advance; and
send the at least one second image to the electronic device.

13. The system according to claim 12, wherein:
a duration of time to switch from the first image to the third image is greater than the duration of time to switch from the first image to the target image.

14. The system according to claim 12, wherein the processor further executes the computer program instructions to:
determine a position of the portion of the candidate image that does not coincide with the operation in the image to be rendered; and partially render the partial region of the image, according to the position of the partial image in the image to be rendered.

* * * * *